(12) United States Patent
Chhorng et al.

(10) Patent No.: US 11,588,182 B2
(45) Date of Patent: Feb. 21, 2023

(54) METHOD AND SYSTEM FOR A BATTERY ELECTRODE HAVING A SOLVENT LEVEL TO FACILITATE PEELING

(71) Applicant: Enevate Corporation, Irvine, CA (US)

(72) Inventors: Monika Chhorng, Irvine, CA (US); Ian Browne, Orange, CA (US)

(73) Assignee: Enevate Corporation, Irvine, CA (US)

(*) Notice: Subject to any disclaimer, the term of this patent is extended or adjusted under 35 U.S.C. 154(b) by 0 days.

(21) Appl. No.: 17/099,155

(22) Filed: Nov. 16, 2020

(65) Prior Publication Data

US 2021/0143483 A1 May 13, 2021

Related U.S. Application Data

(63) Continuation of application No. 16/681,734, filed on Nov. 12, 2019, now Pat. No. 10,840,556.

(51) Int. Cl.
| | |
|---|---|
| *H01M 10/0585* | (2010.01) |
| *H01M 4/62* | (2006.01) |
| *H01M 4/88* | (2006.01) |
| *H01M 4/04* | (2006.01) |
| *H01M 4/66* | (2006.01) |
| *H01M 10/0569* | (2010.01) |

(52) U.S. Cl.
CPC ..... *H01M 10/0585* (2013.01); *H01M 4/0471* (2013.01); *H01M 4/622* (2013.01); *H01M 4/661* (2013.01); *H01M 4/8896* (2013.01); *H01M 10/0569* (2013.01)

(58) Field of Classification Search
CPC ........ H01M 10/0585; H01M 10/0569; H01M 4/0471; H01M 4/622; H01M 4/661; H01M 4/8896
See application file for complete search history.

(56) References Cited

U.S. PATENT DOCUMENTS

| | | |
|---|---|---|
| 10,461,366 B1 | 10/2019 | Anderson |
| 10,840,556 B1 | 11/2020 | Chhorng |
| 2009/0053607 A1* | 2/2009 | Jeong ............... H01M 4/62 429/231.95 |
| 2012/0251858 A1 | 10/2012 | Kato |
| 2014/0166939 A1* | 6/2014 | Park ................ H01M 4/1393 252/502 |
| 2018/0062154 A1* | 3/2018 | Park ................ H01M 4/1395 |

* cited by examiner

*Primary Examiner* — Jane J Rhee
(74) *Attorney, Agent, or Firm* — McAndrews Held & Malloy, Ltd.

(57) ABSTRACT

Systems and methods for a battery electrode having a solvent level to facilitate peeling are disclosed. In examples, a battery may include one or more electrodes and an electrolyte. The electrodes include an electrode slurry layer with a solvent. The electrode slurry is coated on a substrate, where the electrode slurry and substrate produce an active material with a residual amount of solvent in response to a heat-treatment, and where the active material comprises 10% to 25% residual solvent by weight following the heat-treatment. The amount of residual solvent facilitates peeling of the active material from the substrate, which, once pyrolyzed, may be used to create a multi-layer film with the current collector film and the active material.

19 Claims, 6 Drawing Sheets

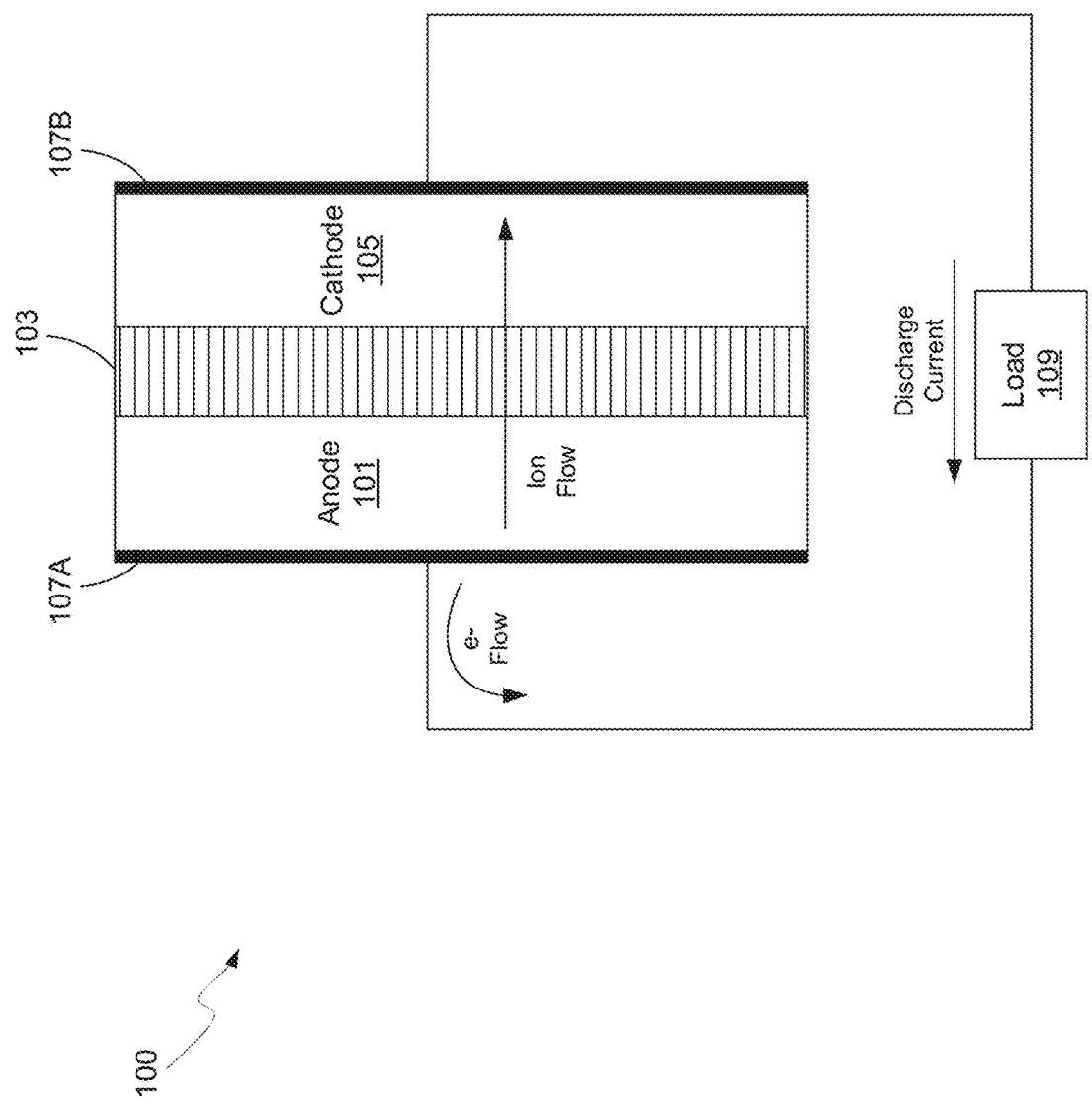

METHOD AND SYSTEM FOR A BATTERY ELECTRODE HAVING A SOLVENT LEVEL TO FACILITATE PEELING

CROSS-REFERENCE TO RELATED APPLICATIONS/INCORPORATION BY REFERENCE

This application is a Continuation of U.S. patent application Ser. No. 16/681,734, entitled "Method And System For A Battery Electrode Having A Solvent Level To Facilitate Peeling", filed Nov. 12, 2019, and issued on Nov. 17, 2020, as U.S. Pat. No. 10,840,556. These documents are hereby incorporated by reference in their entireties.

FIELD

Aspects of the present disclosure relate to energy generation and storage. More specifically, certain embodiments of the disclosure relate to a method and system for a battery with a battery electrode produced with a solvent level selected to facilitate peeling of a substrate during production process.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for a battery with a battery electrode produced with a solvent level selected to facilitate peeling of a substrate during production process, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 1 is a diagram of a battery, in accordance with an example embodiment of the disclosure.

DETAILED DESCRIPTION

Figure 2A:
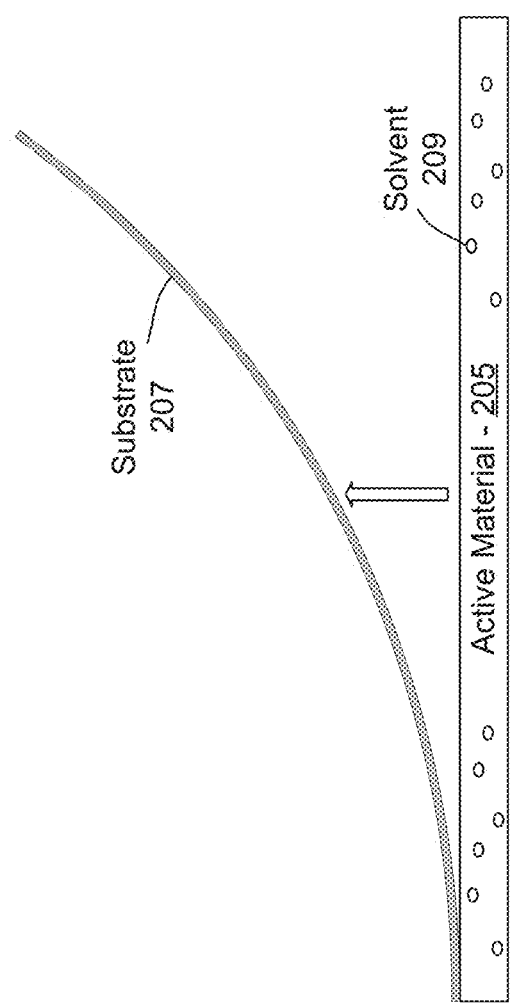
FIGS. 2A, 2B and 2C illustrate anode preparation and application to a current collector, in accordance with an example embodiment of the disclosure.

FIG. 1 is a diagram of a battery with a battery electrode produced with a solvent level in the coated electrode active material (e.g., anode, cathode, etc.) selected to facilitate peeling of a substrate during production process, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101, which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

A solution to problems associated with peeling an active material from a substrate to create a battery electrode are provided. In particular, as disclose herein, a solvent level for the coated electrode active material layer is selected to facilitate peeling of a substrate from the active material that is later attached onto the current collector.

In some lamination processes, an electrode slurry (e.g., an anode slurry) is coated onto a substrate (e.g., a PET film), dried, and then peeled from the substrate prior to further processing. In order to release the slurry from the substrate, a certain amount of solvent level in the coating composition facilitates separation. In some disclosed examples, the amount of solvent by percentage of the coating composition is in the range of approximately 10% to 25%, based on one or more factors including type of active material in the slurry, type of binder material, type of substrate material, for instance.

When the electrode slurry is being prepared, the active material is mixed with an amount of solvent (e.g., N-Methyl pyrrolidone (NMP)), a binder, and optionally additives such as a conductive carbon and surfactant. During a first heat treatment, a certain amount of the solvent will evaporate. In some examples, the range of residual solvent is between 10% to 25% by weight. The active material with the amount of residual solvent is then peeled off of the substrate and further processed (such as a second heat treatment to pyrolyze the active material). The pyrolyzed active material is then applied to the copper foil (e.g., by a lamination process, tape casting, rolling process, etc.), leaving a multi-layered film comprising the electrode or active layer, an adhesive layer, and the current collector layer.

Figure 2B:
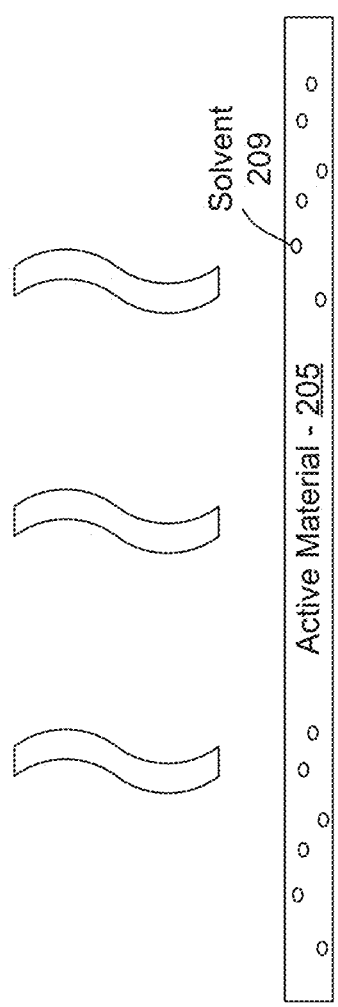
Figure 2C:
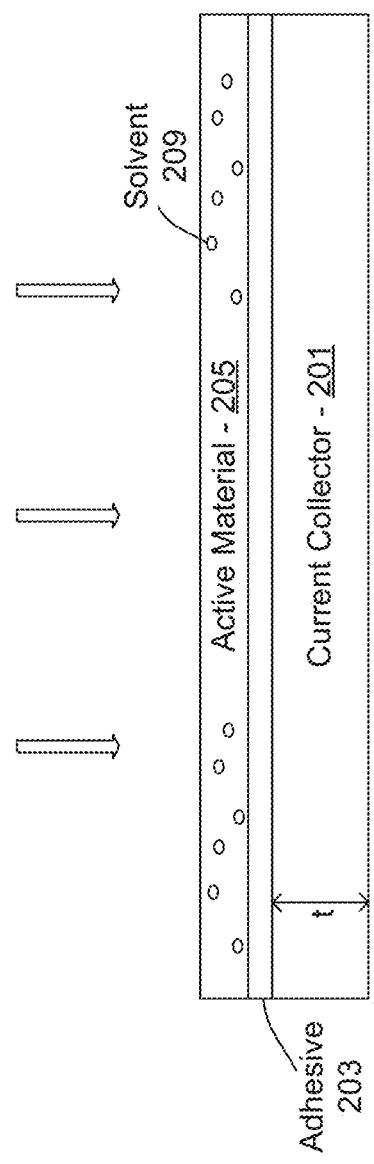

FIGS. 2A, 2B and 2C illustrate anode preparation and application to a current collector, in accordance with an example embodiment of the disclosure. Although some examples are provided with respect to a particular electrode (e.g., an anode or a cathode), the examples (of formation and/or structure) may be applicable to various electrodes not explicitly used in a particular example.

As shown in FIG. 2A, in an example scenario, the active material 205 comprises silicon particles in a binder material and contains an amount of residual solvent 209. The amount of residual solvent 209 is selected such that the active material 205 can be peeled from a substrate 207 following a coating and optional calendering process. Thus, the anode slurry is coated onto the substrate 207 (e.g., a PET material). As controlled by the slurry formulation and conditions of the first heat treatment, the amount of residual solvent 209 (of approximately 10% to 25% by weight) ensures the active material 205 is readily peeled from the substrate 207.

As shown in FIG. 2B, following peeling, the active material 205 is then subjected to a second heat treatment to induce pyrolyzation in the active material 205, which burns off most or all of the remaining solvent 209. The temperature and/or duration of the second heat treatment are selected based on composition of the substrate 207 and/or the anode slurry active material 205, and/or the desired amount of residual solvent 209.

Following the second heat treatment, the active material 205 is laminated onto a current collector 201, bonded together by the adhesive 203, as shown in FIG. 2C. Referring to FIG. 2C, there is shown a current collector 201, an adhesive 203, and an active material 205. Thus, the active material 205 may be bonded to the current collector 201 using the adhesive 203. The current collector 201 may comprise a metal film, such as copper, nickel, or titanium, for example, although other conductive foils may be utilized depending on desired tensile strength.

In some examples, after lamination, the multi-layer film may be heat-treated a third time, such as to cure or dry the remaining layers.

In an example scenario, an anode slurry formulation comprised of a mixture of Silicon (e.g., 22.69% Silicon), carbon additive (e.g., 1.37% carbon), a polymer binder (e.g., 8.70% polyimide), and a solvent (e.g., 67.24% solvent). With this particular composition, a solvent level greater than about 20% provided an anode that was "wet" for peeling. In other words, removal of the anode from the substrate was incomplete and/or non-uniform. At a solvent level below about 10% to 12%, the coated anode had the tendency to stick to the substrate, such that peeling became difficult, and the peeled material was brittle.

As the solvent level in the coated material is reduced, there may be more residue left on the peeled substrate. This is an indication of the resin binding more to the substrate as the solvent level is reduced. In some examples, the surface energy of the substrate affects the ability of the anode slurry to release from the substrate, such that a greater surface energy material will bind to the anode slurry more than a lower surface energy material.

In some examples, the binder material, which may be a polymer (e.g., CMC, SBR, Sodium Alginate, PAI, PAA, PI and mixtures and combinations thereof). The solvent material may be selected to burn off during heat treatment, thereby with a melting temperature lower than the binder. The amount of solvent that is burned off versus the amount that remains depends on several factors, including the type of active material in the anode slurry, the type of binder material, the type of substrate material, the temperatures and/or amount of time the material is subject to the heat treatment, for instance. These and other factors are configurable for a desired result.

In some examples, a substrate may be selected having different surface treatments and/or comprise of multiple materials in multiple layers, such that opposite sides of the substrate may have different properties. Thus, a first surface energy on a first surface of the substrate may be different from a second surface energy of a second surface of the substrate. For instance, the first surface may be treated to reduce the surface energy and the binding effect. The second surface may be untreated, which forms a stronger bond with the anode slurry.

Figure 3:
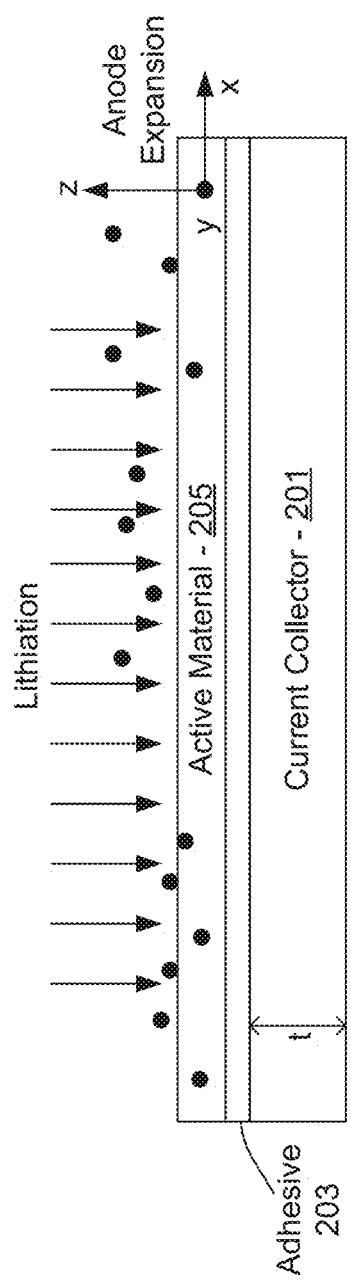
FIG. 3 illustrates anode expansion during lithiation, in accordance with an example embodiment of the disclosure.

FIG. 3 illustrates anode formed via the process disclosed with respect to FIG. 2, the anode undergoing expansion during lithiation, in accordance with an example embodiment of the disclosure. In an example scenario, the active material 205 comprises silicon particles in a binder material and a solvent, the active material 205 being pyrolyzed to turn the binder into a carbon that provides a structural framework around the silicon particles and also provides electrical conductivity. The active material may be coupled to the current collector 201 using the adhesive 203. The current collector 201 may comprise a metal film, such as copper, nickel, or titanium, for example, although other conductive foils may be utilized depending on desired tensile strength.

FIG. 3 also illustrates lithium ions impinging upon and lithiating the active material 205. Example thicker foils may be greater than 6 □m, such as 10 □m or 20 □m for copper, for example, while thinner foils may be less than 6 □m thick in copper. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing.

Figure 4:
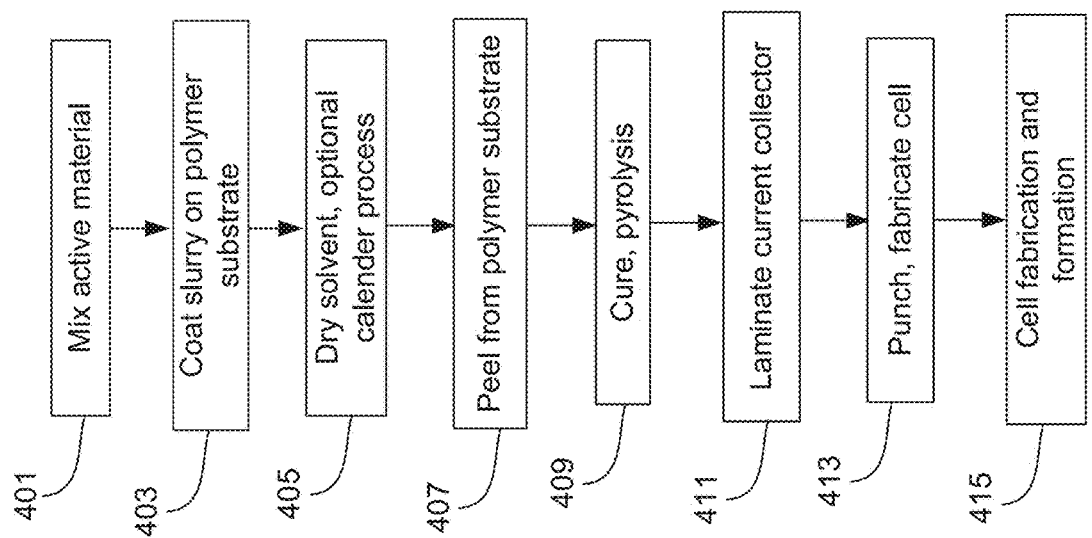
FIG. 4 is a flow diagram of a process for lamination of electrodes, in accordance with an example embodiment of the disclosure.

FIG. 4 is a flow diagram of a process for lamination of electrodes, in accordance with an example embodiment of the disclosure. While some processes to fabricate composite anodes employ a direct coating process, this process physically mixes the active material, conductive additive, and binder together coupled with peeling and lamination processes.

This process is shown in the flow diagram of FIG. 4, starting with step 401 where the active material may be mixed with a binder/resin such as polyimide (PI) or polyamide-imide (PAI), solvent, optionally a silosilazane additive, and optionally a conductive carbon. For example, silicon powder with desired particle size may be dispersed into PI and PAI under high shear dispersion for 1 hour followed by the addition of conductive carbon (such as graphite, graphene, Super P, ECP, conjugated or in combinations) and additional dispersion for, e.g. 1-2 hours. When high surface area carbon additive like super P and ECP are used, the mixture may be dispersed under sonication for, e.g. 30-60 minutes to increase the homogeneity. Alternative to sonication mixing, ball mill may also be used as a high energy mixing method. The mixture may then be diluted with a solvent such as N-Methyl-pyrrolidone (NMP) using high shear dispersion at, e.g., 1000 rpm to achieve a slurry viscosity within 2000-4000 cP and a total solids content above 30%. Depends on the materials, mixing method, speed, and duration may be varied to achieve a homogenous mixture. The particle size of the silicon powder and carbon additive may be varied to configure the active material density and/or roughness.

In step 403, the slurry may be coated on a polymer substrate, such as polyethylene terephthalate (PET), polypropylene (PP), or Mylar. The slurry may be coated on the PET/PP/Mylar film at a loading of 1.5-6 mg/cm$^2$, and then dried (e.g., subjected to a first heat treatment) to remove a portion of the solvent in step 405, resulting in an active material layer. The residual amount of solvent may be approximately 10% to 25% depending on the desired application or result. An optional calendering process may be utilized where a series of hard pressure rollers may be used to finish the film/substrate into a smoothed and denser sheet of material.

In step 407, the heat-treated active material layer, having a certain amount of residual solvent, is peeled from the polymer substrate. The peeling may be followed by a cure and pyrolysis step 409 where the film may be cut into sheets, and vacuum dried using a two-stage process (100-140° C. for 15h, 200-240° C. for 5h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In an optional or alternative process, a green film may be applied to a PET substrate, and then removed from the PET. In particular, the active material is laminated onto the adhesive and/or current collector, and then peeled off the polymer substrate and heat-treated to induce pyrolyzation.

In step 411, the pyrolyzed active material layer is laminated onto the current collector (with or without an adhesive layer therebetween). In step 413, the pyrolyzed material may be flat press or roll press laminated on the current collector, where a copper foil may be coated with polyamide-imide with a nominal loading of 0.2-0.6 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 415, the electrode may then be sandwiched with a separator and cathode with the electrolyte to form a cell. The cell may be subjected to a formation process, comprising initial charge and discharge steps to lithiate the anode, with some residual lithium remaining.

In an example embodiment of the disclosure, a method and system is described for forming a battery comprising one or more electrodes and an electrolyte. In some examples, the method of forming an electrode of the one or more electrodes comprises mixing an electrode slurry comprising a solvent; applying the electrode slurry to a substrate; applying a first heat-treatment to the electrode slurry and substrate to produce an active material with a residual amount of solvent; peeling the substrate from the active material; and applying a second heat treatment to pyrolyze the active material. The pyrolyzed active material is then laminated onto the current collector film. In some examples, the active material comprises 10% to 25% residual solvent by weight following the first heat-treatment. For example, the solvent can be an N-Methyl pyrrolidone (NMP) solvent In some examples, a flat press or roll laminating process can be applied to the pyrolyzed active material onto the current collector to form a silicon-composite electrode. A cell can be formed by sandwiching a separator and the cathode with the silicon-composite electrode.

In some disclosed examples, a battery can be formed, with the battery comprising an electrode comprising an electrode slurry layer comprising a solvent, the electrode slurry coated on a substrate. The electrode slurry and substrate produce an active material with a residual amount of solvent in response to a first heat-treatment, such that the active material comprises 10% to 25% residual solvent by weight following the first heat-treatment to facilitate peeling of the active material from the substrate prior to lamination onto a current collector to create a multi-layer composite electrode film with the current collector film and the active material. Further, a cathode may be arranged on a first side of a separator and the silicon-composite electrode can be arranged on a second side of the separator to form a cell.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method of forming a battery, the method comprising:
    forming a battery comprising one or more electrodes and an electrolyte, the method of forming an electrode of the one or more electrodes comprising;
        mixing an electrode slurry comprising a solvent;
        applying the electrode slurry to a removable substrate;
        applying a first heat-treatment to the electrode slurry and substrate to produce an active material with a residual amount of solvent, wherein the active material comprises 10% to 25% residual solvent by weight following the heat-treatment; and
        laminating the heat-treated active material onto a current collector film.

2. The method according to claim 1, further comprising:
peeling the removable substrate from the active material; and
applying a second heat treatment to pyrolyze the active material.

3. The method according to claim 1, further comprising applying a flat press or roll laminating the pyrolyzed active material onto the current collector to form a silicon-composite electrode.

4. The method according to claim 3, wherein the silicon-composite electrode is an anode, the method further comprising forming a cell by sandwiching a separator and a cathode with the anode.

5. The method according to claim 1, wherein the solvent is an N-Methyl pyrrolidone (NMP) solvent.

6. The method according to claim 1, wherein the binder comprises one of a polyimide (PI) or polyamide-imide (PAI) material.

7. The method according to claim 1, further comprising coating the current collector with a polymeric adhesive layer prior to lamination.

8. The method according to claim 1, wherein the substrate comprises a polyethylene terephthalate (PET) material.

9. A method of forming a battery, the method comprising:
mixing an electrode slurry comprising a solvent;
applying the electrode slurry to a removable substrate; and
applying a first heat-treatment to the electrode slurry and substrate to produce an active material with 10% to 25% of a residual amount of solvent by weight.

10. The method according to claim 9, further comprising:
laminating the heat-treated active material onto a current collector film; and
peeling the removable substrate from the active material.

11. The method according to claim 9, further comprising applying a second heat treatment to pyrolyze the active material.

12. The method according to claim 9, further comprising applying a flat press or roll laminating the pyrolyzed active material onto the current collector to form a silicon-composite electrode.

13. The method according to claim 12, wherein the silicon-composite electrode is an anode, the method further comprising forming a cell by sandwiching a separator and a cathode with the anode.

14. The method according to claim 9, wherein the solvent is an N-Methyl pyrrolidone (NMP) solvent.

15. The method according to claim 9, wherein the binder comprises one of a polyimide (PI) or polyamide-imide (PAI) material.

16. The method according to claim 9, further comprising coating the current collector with a polymeric adhesive layer prior to lamination.

17. The method according to claim 9, wherein the substrate comprises a polyethylene terephthalate (PET) material.

18. A method of forming a battery, the method comprising:
forming a battery comprising one or more electrodes and an electrolyte, the method of forming an electrode of the one or more electrodes comprising;
mixing an electrode slurry comprising a solvent;
applying the electrode slurry to a removable substrate;
applying a first heat-treatment to the electrode slurry and substrate to produce an active material with a residual amount of solvent, wherein the active material comprises 10% to 25% residual solvent by weight following the heat-treatment;
peeling the substrate from the active material; and
laminating the heat-treated active material onto a current collector film to create a multi-layer composite electrode film.

19. The method of claim 18, further comprising:
applying the multi-layer composite electrode film to a first side of a separator film; and
applying a cathode to a second side of the separator opposite the first side.

* * * * *